(12) United States Patent
Chielens et al.

(10) Patent No.: US 8,622,353 B1
(45) Date of Patent: Jan. 7, 2014

(54) CYLINDRICAL DRUM SUPPORT DEVICE

(75) Inventors: Alain Chielens, Mouvaux (FR); Pierre Mettavant, Hellemmes-Lille (FR); Guillaume Mettavant, legal representative, Hellemmes-Lille (FR); Stéphanie Mettavant, legal representative, Hellemmes-Lille (FR)

(73) Assignee: FCB Societe Anonyme, Montreuil (FR)

( * ) Notice: Subject to any disclaimer, the term of this patent is extended or adjusted under 35 U.S.C. 154(b) by 0 days.

(21) Appl. No.: 09/194,839

(22) PCT Filed: Apr. 14, 1998

(86) PCT No.: PCT/FR98/00750
§ 371 (c)(1),
(2), (4) Date: Dec. 3, 1998

(87) PCT Pub. No.: WO98/46952
PCT Pub. Date: Oct. 22, 1998

(30) Foreign Application Priority Data

Apr. 16, 1997 (FR) ...................................... 97 04922

(51) Int. Cl.
*F16C 19/50* (2006.01)
(52) U.S. Cl.
USPC ............................ 248/130; 248/676; 384/125

(58) Field of Classification Search
USPC .......... 248/130, 580, 637, 676, 678; 384/125, 384/126, 127, 416, 418, 548, 549, 551
See application file for complete search history.

(56) References Cited

U.S. PATENT DOCUMENTS

| | | | | | |
|---|---|---|---|---|---|
| 3,950,212 | A | * | 4/1976 | Bullmann | 156/398 |
| 4,171,949 | A | * | 10/1979 | Endersen et al. | 432/103 |
| 4,852,748 | A | * | 8/1989 | Burgess et al. | 211/70.6 |
| 5,462,370 | A | * | 10/1995 | Kastingschafer et al. | 384/549 |
| 5,636,748 | A | * | 6/1997 | Arvidson | 209/223.2 |
| 5,897,214 | A | * | 4/1999 | Nisley | 384/537 |
| D508,349 | S | * | 8/2005 | Wu | D6/456 |

* cited by examiner

*Primary Examiner* — Steven Marsh
(74) *Attorney, Agent, or Firm* — Egbert Law Offices, PLLC

(57) ABSTRACT

A support device for a rotary drum having at least one roller capable of cooperating with the drum. At least two bearings permit the rotation of the roller about its axis of rotation. The support device has a chassis into which the bearings are secured. The chassis is mounted for pivoting about a pivotal axis substantially perpendicular to the plane passing through the axis of rotation of the roller and perpendicular to a block onto which the support device is placed. The device also includes a connector which is flexible in a given direction and rigid in the directions orthogonal to the direction of flexibility. The connector maintains the bearings on the block while permitting free pivotal movement of the chassis in such a way to permit alignment of the roller on the drum in the event of pivoting.

12 Claims, 3 Drawing Sheets

CYLINDRICAL DRUM SUPPORT DEVICE

TECHNICAL FIELD

The present invention relates to a support device for a rotary drum such as, for example, an oven, drier, cooler, or other apparatus, intended, in particular, for heat and/or chemical treatments for materials. It also relates to a rotary drum equipped with such a support device.

Although more especially developed for the applications mentioned above, the present invention can also be used in numerous other sectors of industrial activity, such as the farm-produce industry, to equip, in particular, primary sugar extractors or the like.

BACKGROUND ART

The rotary drums currently used in these different fields are habitually of a substantially cylindrical, elongated shape. For support, they rest on cylindrical rollers, generally disposed in pairs to constitute a rolling station directly co-operating with the outer shell of the drum or with roller rings and/or tracks, or strips, provided around the outer shell.

The axes of the rollers are parallel to the main axis of the drum. The rolling stations, hence the rings, are at least two in number: in this case, the drum is isostatically supported. They can also be more numerous, according to the dimensions of the apparatus, and, in particular, the length/diameter ratio. There may thus be three, four or more rolling stations. In this case, the support is 'hyperstatic', or statically redundant.

By way of example, the calcining kilns or furnaces used in the cement industry or in the treatment of ores have diameters possibly in excess of 7 m and lengths possibly in excess of 200 m; primary sugar extractors can have a diameter of 9 m or more for a length of 60 m or more.

The rotational movement of the apparatus is most often obtained by means of an annular gear fixed to the outer wall, driven by one or more gear wheels, themselves driven by a motor.

Another known technique, particularly in the sugar industry, consists in driving the apparatus directly through friction between roller and roller ring, one or more rollers being driven via a mechanical or hydraulic transmission system.

The rotary drum is subjected to numerous mechanical stresses, either on account of its movement, and of the weight of the material being processed, or on account of temperature gradients when heat exchange takes place. It is liable, therefore, to become deformed, temporarily or permanently, with the result that its main axis is no longer rectilinear.

One consequence is that the part of its axis located in the area of contact between roller and roller ring is not parallel to the axis of the rollers.

In this case, contact between the rollers and the roller ring is not uniform over the entire width. The stress applied to the roller, and to the roller ring, can then attain locally high values which cause abnormal, irregular wear.

In addition, when the drum is driven in rotation by the roller or rollers, the contact surface may become insufficient to transmit the driving torque.

To avoid this drawback, there are known roller supports enabling the axis of the roller to be held constantly parallel to that of the roller ring. However, in the devices developed to date to obtain this result, the mobility of the roller support is obtained by means of sliding connections.

Such devices thus require maintenance so that sliding can always take place. In addition, the sliding causes wearing of the mechanical components in question, and generates a load moment which opposes the mobility of the support and causes a phenomenon of hysteresis.

The object of the present invention is to provide a support device for a rotary drum, including at least one roller capable of co-operating with the drum, such as to remedy the aforementioned drawbacks and enable the axis of the roller to be held constantly parallel to that of the drum.

Another object of the invention is to provide a support device for a rotary drum in which the number of parts subjected to friction is minimized.

One advantage of the present invention is that it slows down the wearing of the mechanical parts used.

Further objects and advantages of the present invention will emerge in the course of the description that follows, which is given merely by way of illustration and is not intended to limit same.

SUMMARY OF THE INVENTION

The present invention relates to a support device for a rotary drum such as an oven, drier, cooler or other apparatus, intended, in particular, for heat and/or chemical treatments for materials, including at least one roller, capable of co-operating with the drum, and at least two bearings, capable of permitting the rotation of the roller about is axis of rotation, characterized by the fact that it further includes:

a chassis, to which the bearings are secured, mounted for pivoting about a pivotal axis substantially perpendicular to the plane passing through the axis of rotation of the roller and normal to the base, or block, on which the device is placed, termed a 'pivotal plane';

connecting means, flexible in a given direction, termed the 'direction of flexibility', and rigid in the directions orthogonal to the direction of flexibility, to maintain the bearings on the block while permitting free pivotal movement of the chassis, in such a way as to permit alignment of the roller on the drum in the event of the latter pivoting.

BRIEF DESCRIPTION OF THE DRAWINGS

The invention also relates to a rotary drum equipped with at least one support device as described above.

The present invention will be more readily understood from a study of the following description, accompanied by the annexed drawings, which form an integral part thereof, and wherein.

DETAILED DESCRIPTION OF THE INVENTION

The present invention relates to a support device for a rotary drum such as an oven, drier, cooler or other apparatus, intended, in particular, for heat and/or chemical treatments for materials.

However, although more especially designed for such applications, it can also be used in numerous other sectors of industrial activity, such as the farm-produce industry, to equip, in particular, primary sugar extractors or other apparatus.

Generally speaking, the rotary drums are constituted by apparatus which are substantially cylindrical, having a tubular structure which is substantially circular in cross-section, capable of being driven about their longitudinal axes.

Figure 1:
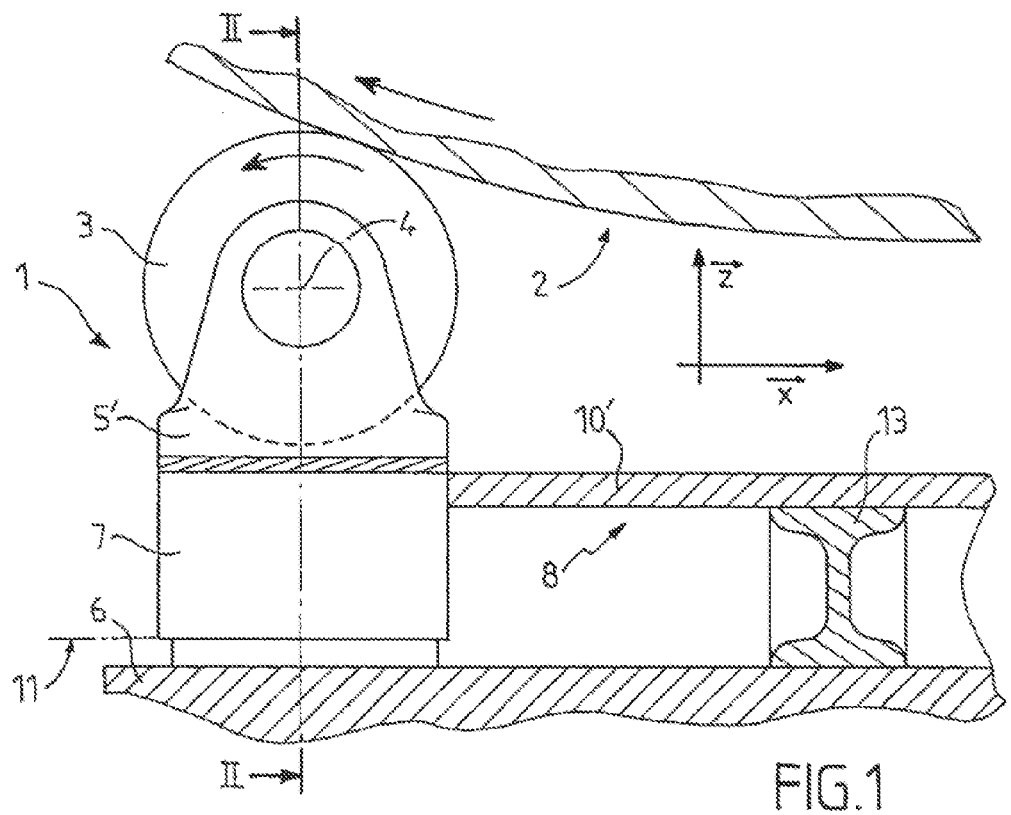
FIG. 1 is a cross-sectional view illustrating a first exemplary form of embodiment of the support device according to the invention, the cross-section being effected in a plane perpendicular to the axis of rotation of the rotary drum with which the support device co-operates.

As shown in FIG. 1, the support device 1 for a rotary drum 2 according to the invention includes at least one roller 3, capable of co-operating with the drum 2.

The roller 3 permits, in particular, either rolling only of the said drum 2, the latter being driven by other means, or both the rolling and the driving of the drum. It has, for example, a cylindrical structure, with a circular cross-section, its axis of rotation 4 being substantially parallel to that of the drum 2.

To permit rotation of the roller 3 about the said axis of rotation 4, the support device 1 according to the invention also includes at least two bearings 5, 5'.

In the remainder of the text, to make it easier to understand how the device according to the invention operates, we shall use a system of orthogonal co-ordinates, x, y, z, with the y direction corresponding to that of the axis of drum 2 and/or of roller 4, and the z direction corresponding to that of the line perpendicular to the block 6 on which the said device 1 is placed.

According to the invention, the support device 1 enables the roller 3 to be aligned on drum 2 in the event of the latter pivoting.

Figure 2:
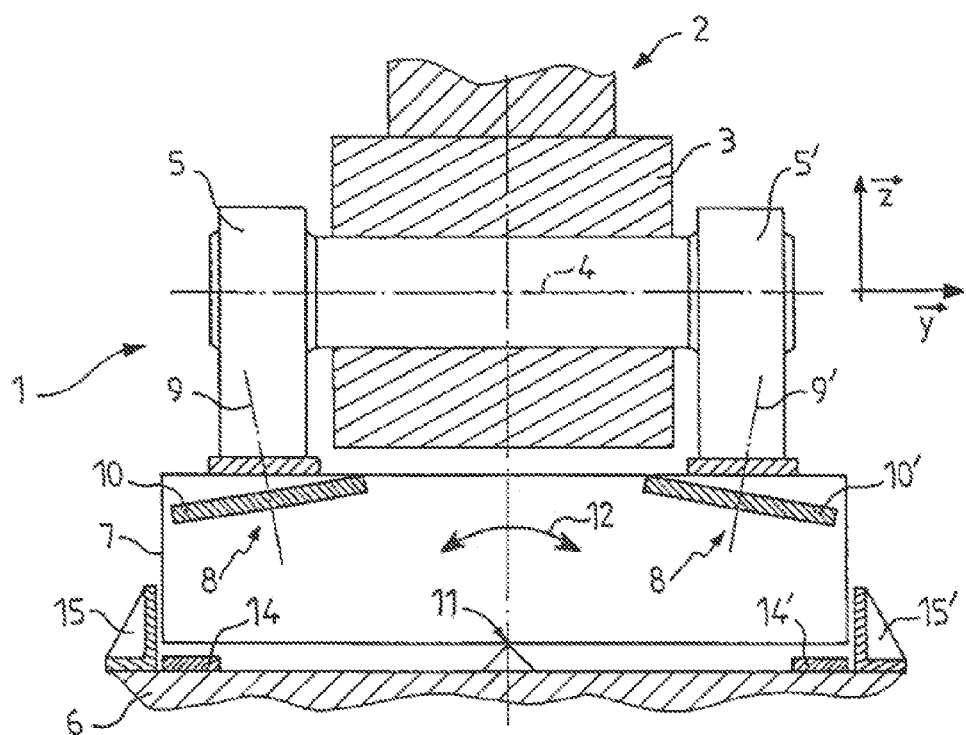
FIG. 2 is a cross-sectional view along line II-II of preceding FIG. 1.

For this purpose, as can be seen, when referring to both FIGS. 1 and 2, it further includes a chassis 7, to which are secured bearings 5, 5'. As illustrated by double arrow 12, the chassis 7 is mounted so as to be able to pivot about a pivotal axis, orientated in the direction x and bearing reference number 11, substantially perpendicular to the plane y, z passing through the axis of rotation 4 of the roller 3 and perpendicular to the block 6, called the 'pivotal plane'.

Thus, when the position of the axis of drum 2 varies in the course of its operation, roller 3 is capable of making its axis 4 parallel with that of the drum 2, and of ensuring uniform contact with the peripheral surface of the drum 2.

In addition, to hold the bearings 5, 5' on the block 6, while permitting free pivotal movement of the chassis 7, the support device 1 includes connecting means 8, flexible in a given direction, referenced 9, 9', called the 'direction of flexibility', and rigid in the directions orthogonal to the direction of flexibility 9, 9'.

The movements as a whole are thus effected without sliding, which thus makes it possible to reduce wear phenomena.

The length of chassis 7 is slightly greater than the center to center distance of axes provided for between the said bearings 5, 5'.

The said connecting means 8 are constituted by at least two elongated pieces 10, 10', in particular parallelepiped, provided so as to be substantially symmetrically on either side of plane x, z, called the 'mid-plane', passing through pivotal axis 11 and orthogonal to the pivotal plane y, z. The pieces 10, 10' are secured, on one hand, to the chassis 7 and, on the other hand, to the block 6, in particular via a supporting member 13.

The direction of flexibility 9, 9' is designed to have an orientation approximating to the line z perpendicular to block 6 or merging with the line perpendicular to block 6.

The elongated pieces 10, 10' are constituted, in particular, by a beam with a cross-section that is flattened substantially rectangular, and the thickness of which is small in relation to the width and the length of the beams, the length of the flattened cross-section being orientated in a direction substantially orthogonal to the direction of flexibility 9, 9'.

It will also be noted that, when chassis 7 pivots, through the action of drum 2, the elongated pieces 10, 10' are subject to deformation, in particular in flexion being elastically deformed as a function of the nature of the material chosen.

In practice, this deformation is very slight. The amplitude of drum 2 deformation is, in fact, quite small. In addition, under normal operating conditions, the amplitude of the vertical movements of the chassis 7 must not exceed a given value, which can be fixed, by way of example, at $8.10^{-5}$ times the length of drum 2.

In this connection, device 1 according to the invention can further include adjusting blocks 14, 14' and/or stops 15, 15', capable of limiting any displacement of the device 1.

The adjusting blocks 14, 14' are fixed to block 6 and mechanically restrict the amplitude of the vertical movement of chassis 7 to a value less than or equal to an upper limit situated between $3.10^{-5}$ and $8.10^{-5}$ times the length of the drum 2. They thus prevent the support device 1 from being damaged following the occurrence of abnormal conditions.

For similar reasons, stops 15, 15' are fixed to block 6 on each side of the longitudinal ends of the chassis 7. They thus prevent horizontal movement of the latter in direction y.

The elongated pieces 10, 10' are perpendicular to the chassis 7 and thus orientated substantially parallel to direction y.

Figure 3:
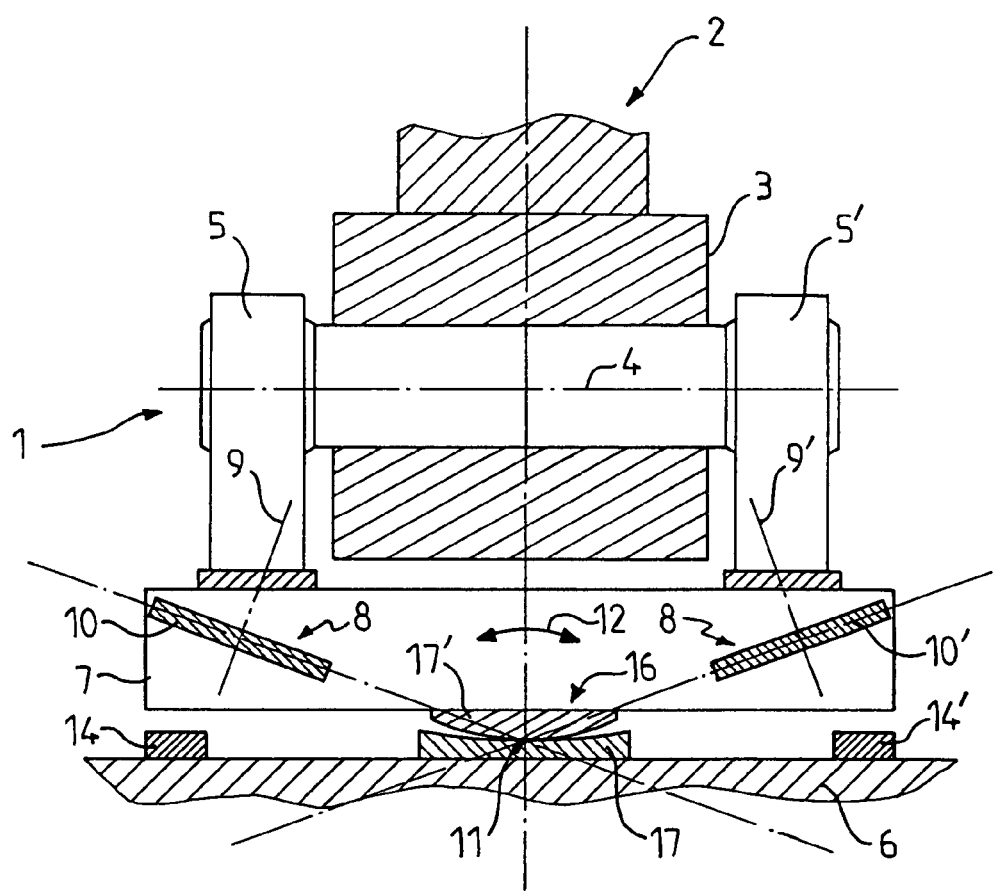
FIG. 3 is a cross-sectional view, produced in the same way as in FIG. 2, illustrating another advantageous exemplary embodiment of the support device according to the invention.

As shown in FIG. 3, according to one advantageous form of embodiment, the direction of flexibility 9, 9' is designed to have an orientation approximating to the tangent to the circle having as its center the point of intersection between the plane of articulation y, z and pivotal axis 11 and passing in the area of the point at which the elongated pieces 10, 10' are attached to chassis 7. In this particular case, the beams 10, 10' are orientated radially.

The pivotal axis 11 is provided, in particular, in the area of the plane of symmetry x, z of the bearings 5, 5', that is to say in the area of the mid-plane.

According to a first alternative form of embodiment, pivoting is effected by rotation about the pivotal axis 11.

However, according to one advantageous alternative form of embodiment, corresponding to the one illustrated in FIG. 3, pivoting can be effected by rolling. For this purpose, device 1 further includes a support member 16, in the area of which the pivotal axis 11 is provided.

The support member 16 is constituted, in particular, by two pieces, 17, 17', co-operating with one another, the upper one 17' being secured to the chassis 7, and the other, lower one, 17, to the block 6. The said pieces 17, 17' are formed by a sector of a cylinder with a circular cross-section, the axis of the cylinder being parallel to the pivotal axis 11 and the radius of the upper piece 17' being slightly smaller than the radius of lower piece 17.

According to another form of embodiment, one of the pieces 17, 17' can have a plane contact surface.

In these different cases, chassis 7 then rolls, without sliding, on block 6, the pivotal axis 11 being defined by the line of contact between the lower and upper pieces 17, 17'.

Figure 4:
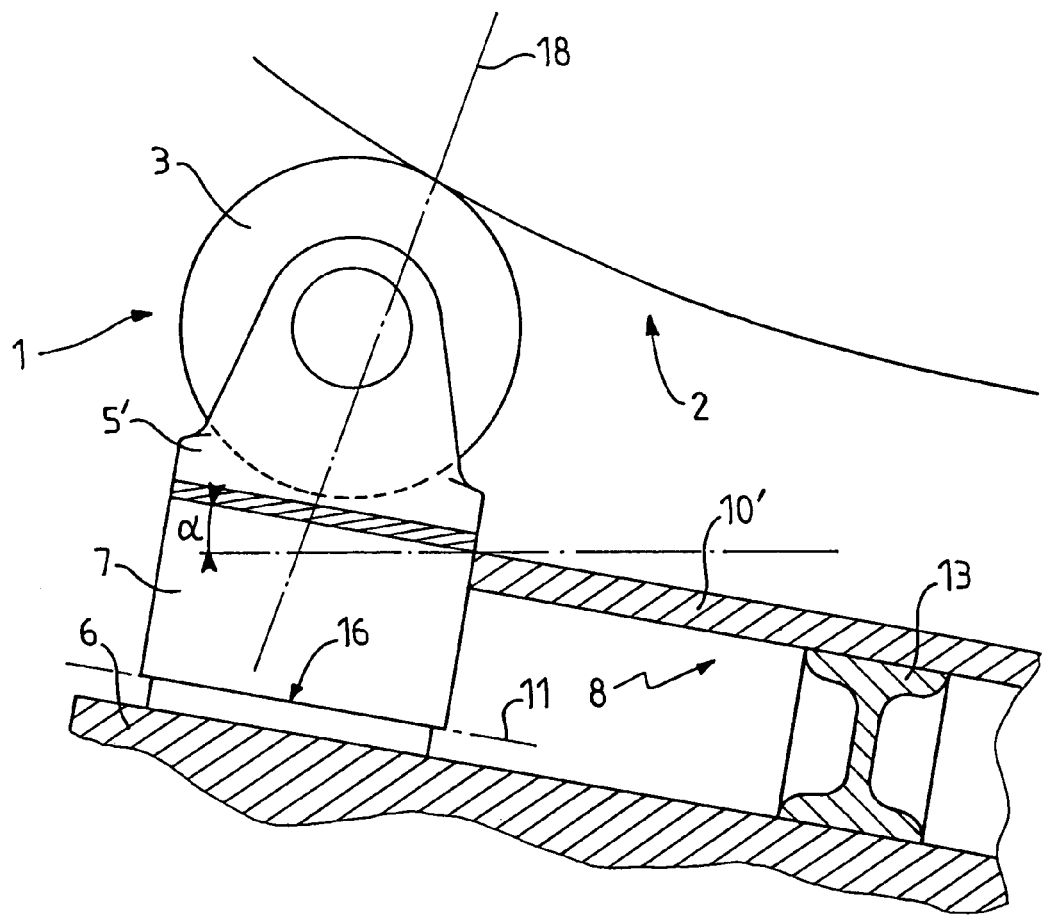
FIG. 4 again shows the support device illustrated in FIG. 1 in a different utilization configuration.

This being the case, FIG. 4 represents, by the direction referenced 18, the resultant of the forces exerted on roller 3 by the weight of the drum 2, on one hand, and the frictional forces, on the other hand.

In order for support device 1 as a whole to be in stable mechanical equilibrium, the resultant 18 must intersect support member 16 between its two end points. It may be necessary, in order to fulfil this condition, to increase the dimensions of device 1 beyond what is necessary for its mechanical strength.

To avoid this, it is also possible, if applicable, to provide a device 1 inclined by a given angle α in relation to the horizontal in the direction of drum 2 in a plane perpendicular to the pivotal plane y, z in such a way that the resultant 18 of the forces exerted by drum 2 on the device 1 passes in the vicinity of the intersection of the pivotal plane y, z and of the pivotal axis 11.

In this case, the block 6 is itself also, possibly, inclined by the same angle α.

The invention also relates to a rotary drum 2 equipped with at least one support device 1 as presented hereabove.

Advantageously, the rotary drum 2 will be equipped with one or more rolling stations constituted by two support devices 1 as described hereabove.

Incidentally, it should be noted that roller 3 is either in direct contact with the outer surface of the drum 2, or in contact with a ring provided around the drum 2 in the area of each rolling station, as shown.

Furthermore, as already mentioned, the invention can be applied to rotary drums of a large size, whatever the way in which they are driven, either via an annular gear and gear wheels, or by friction between roller and drum. In the latter case, the drive rollers will advantageously be integrated in support devices 1 such as those described above.

Other forms of embodiment, within the grasp of a man of the art, could, of course, have been contemplated without thereby departing from the scope of the present application.

I claim:

1. A rotary drum having at least one support apparatus comprising:
    at least one roller cooperative with the rotary drum;
    a block suitable for supporting the support apparatus;
    at least two bearings cooperative with the roller so as to allow the roller to rotate about an axis of rotation;
    a chassis secured to said at least two bearings, said chassis being mounted so as to pivot about a pivot axis substantially parallel to a plane passing through the axis of rotation of the roller and perpendicular to said block; and
    a connecting means which is flexible in a given direction and which is rigid in a direction orthogonal to the given direction, said connecting means for maintaining said at least two bearings on said block while permitting free pivotal movement of said chassis so as to permit an alignment of said roller on said drum as the rotary drum pivots.

2. The rotary drum of claim 1, said connecting means comprising at least two elongated pieces arranged symmetrically on sides of a plane passing through said pivot axis so as to be orthogonal to pieces secured thereto.

3. The rotary drum of claim 1, said block having a line perpendicular to said block, said given direction of the flexibility of said connecting means having an orientation approximating said line.

4. The rotary drum of claim 2, each of the elongated pieces being a beam having a flattened cross-section, said flattened cross-section being oriented in a direction substantially orthogonal to said given direction of flexibility of said connecting means.

5. The rotary drum of claim 2, the plane passing through the axis of rotation of said roller and said pivot axis intersecting at a point of intersection, said point of intersection defining a center of a circle having a radius defined by a distance between the center of the circle and a point of attachment of the elongated pieces to said chassis, said given direction of flexibility of said connecting means having an orientation approximating a tangent of the circle, said tangent being defined by a line passing through the point of attachment and perpendicular to the radius of the circle.

6. The rotary drum of claim 2, said pivot axis being in an area of a plane of symmetry of the bearings.

7. The rotary drum of claim 2, further comprising:
    a support member positioned in an area in which said pivot axis is located, said support member having two pieces cooperative with each other, one of said two pieces being an upper piece secured to said chassis, another of said two pieces being a lower piece secured to said block, said two pieces being formed by sections of a cylinder having a circular cross-section, an axis of said cylinder being parallel to said pivot axis.

8. The rotary drum of claim 1, the support apparatus further comprising:
    adjusting blocks suitable for restricting displacement of the support apparatus.

9. The rotary drum of claim 2, the plane passing through the axis of rotation of said roller and said pivot axis intersecting at a point of intersection, said block inclined by a given angle in relation to horizontal in a direction of the drum in a plane perpendicular to said plane passing through the axis of rotation of said roller such that forces exerted by the drum are adjacent to said point of intersection.

10. An oven having the rotary drum of claim 1.

11. A dryer having the rotary drum of claim 1.

12. A cooler having the rotary drum of claim 1.

* * * * *